Oct. 9, 1923.
S. HUNTER
1,470,324
REMOVABLE BODY FOR AUTOMOBILES
Filed Nov. 25, 1921
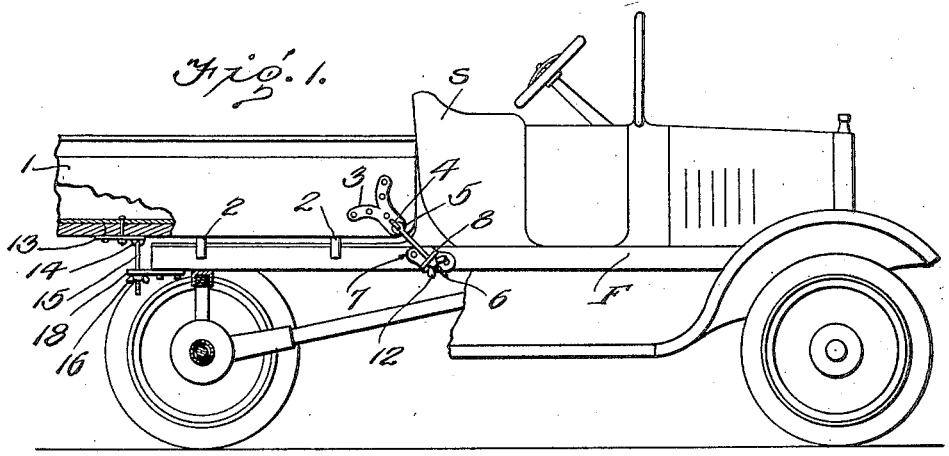
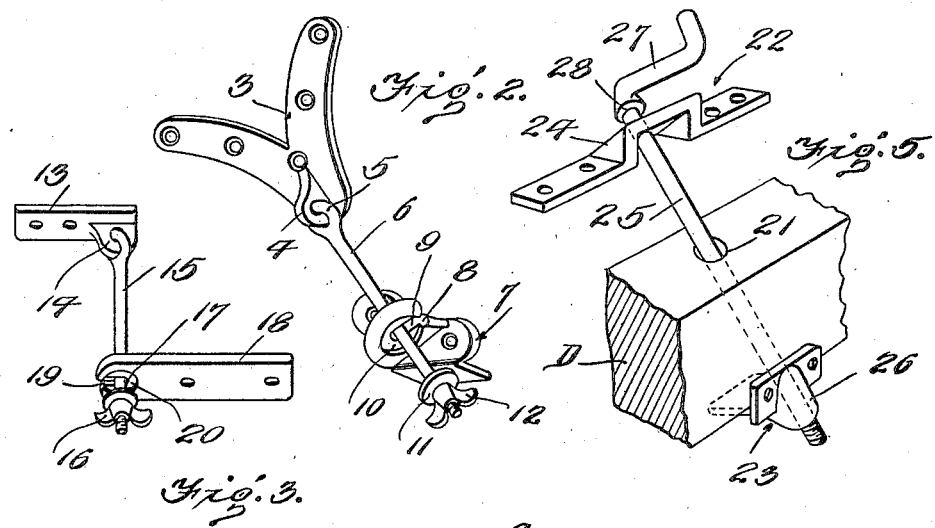
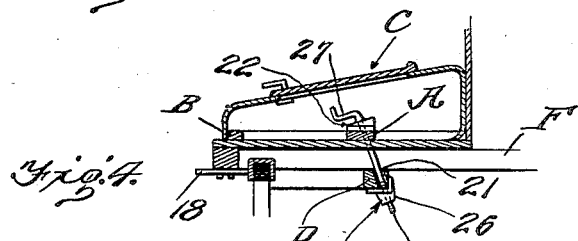
Witness
J. R. Pirce.
Inventor
S. Hunter
By H. B. Willson & Co.
Attorneys Patented Oct. 9, 1923.

1,470,324

UNITED STATES PATENT OFFICE.

SAMUEL HUNTER, OF BELLEVUE, PENNSYLVANIA.

REMOVABLE BODY FOR AUTOMOBILES.

Application filed November 25, 1921. Serial No. 517,733.

*To all whom it may concern:*

Be it known that I, SAMUEL HUNTER, a citizen of the United States, residing at Bellevue, in the county of Allegheny and State of Pennsylvania, have invented certain new and useful Improvements in Removable Bodies for Automobiles; and I do declare the following to be a full, clear, and exact description of the invention, such as will enable others skilled in the art to which it appertains to make and use the same.

This invention relates to means for enabling an ordinary Ford runabout to be converted into a truck by simply removing the ordinary luggage carrier on the rear and replacing it with a comparatively small truck body.

The principal object of the invention is to generally improve upon devices of this class by providing a plurality of novel brackets which are such in construction that they enable the change to be quickly and easily made so that when occasion calls for light hauling, the metal luggage carrier can be removed and replaced with a light-weight truck body.

Another object of the invention is to provide novel attaching brackets which are such in construction that they do not detract from the appearance of the machine when the luggage carrier is in place, being hidden entirely from view and disposed at a point to enable them to be conveniently manipulated.

A further object of the invention is to provide attaching brackets which are such that they do not require any alteration of the existing parts, the attaching means for the luggage carrier simply requiring the turning of the hand crank with which the connecting bolt is provided, and the bolts or links of the attaching means for the truck body being receivable in seats in the brackets with which they co-act and securely held against pivotal movement by binding nuts.

A further object of the invention is to provide novel attaching means for a truck body wherein the parts with which the links co-act are so constructed that there is little or no chance of the body becoming accidentally displaced by accidental loosening of the links.

Other objects and advantages of the invention will be apparent during the course of the following description.

In the accompanying drawings forming a part of this specification and in which like numerals are employed to designate like parts throughout the same:

Figure 1 is a side elevational view with parts removed showing a runabout equipped with the improved truck body.

Figures 2 and 3 are detail perspective views of the novel attaching devices used in connection with the truck body.

Figure 4 is a sectional view through the rear end of a runabout showing the luggage carrier and means for holding it in position and permitting it to be detached.

Figure 5 is an enlarged perspective view showing the last named means more clearly.

Confining attention first to Figs. 1 to 3 inclusive, it will be seen that the removable truck body is designated by the numeral 1 and that it is supported on that part of the automobile chassis frames extending beyond the single seat S. The truck body is equipped with depending guides 2 which engage the side bars of the same and assist greatly in enabling a single person to place the body in position on the frame. The truck body may be of any suitable construction and inasmuch as this constitutes no part of the invention, it is not to be described. The invention resides, as before indicated, in the novel means for holding the body in position on the frame and enabling it to be removed quickly and easily to be replaced with the ordinary metal luggage carrier C. Duplicate attaching devices are employed for connecting the forward end of the body with the frame and different and simpler devices are employed for connecting the rear portion of the body with the adjacent part of the frame. Attention is directed first to Fig. 2 wherein one of the first named devices is clearly shown and it will be seen that each of these devices comprises a substantially V-shaped bracket 3 formed with a plurality of holes for passage of the fastenings. These brackets are secured to the lower forward corner of the sides of the body as shown in Fig. 1 and each bracket is formed with a laterally disposed apertured ear 4 to which the eye 5 of a link 6 is pivotally connected. At its free end, each link is screw-threaded and adapted to be detachably connected with another bracket 7 secured to the side bar of the chassis frame adjacent the seat. By carefully examining the bracket 7 it will be seen that it includes a vertically disposed apertured part which is bolted or otherwise secured to the aforesaid side bar and a horizontally disposed part which underlies the side bar. The vertically disposed part carries an outwardly directed extension 8 which is formed with a notch 9 into which the free end of the aforesaid link is swung. The underside of the extension 8 is formed with a substantially circular recess 10 for reception of the washer 11 and a thumb nut 12 is placed on the threaded end of the link and serves to connect the link with the bracket 7 and to force and retain the washer in said recess to prevent accidental disengagement of the link from the bracket 7. It may be stated here that although a portion of the foregoing description is in the singular, it is understood that the attaching device on the opposite side is a duplicate of the one just described. Also, the attaching devices which serve to connect the rear end portions of the truck body with the corresponding part of the chassis frame are duplicates and only a single device will be described.

Directing attention now to Fig. 3, wherein the last named devices are clearly shown, it will be seen that each one comprises a bracket or plate 13 which is bolted or otherwise secured to the bottom of the truck body this plate being equipped with a depending apertured ear 14 and link 15 being pivotally connected therewith in the manner already described. This link is likewise screw-threaded at its free end and a thumb nut 15 is threaded thereon and a washer 17 co-acts therewith. Another plate 18 is bolted to the rear cross-piece of the frame and one end thereof is permitted to project beyond this cross-piece, this end being formed with a notch 19 for reception of the link and the lower face of the plate being formed with a circular recess 20 for reception of the washer 17.

The means employed for retaining the luggage carrier C in position is somewhat different from that previously described. Before describing this means it is thought well to set forth the fact that it is designed for co-action with the cross-piece A of the base frame B of the luggage carrier and is also co-operable with a cross-piece D constituting a part of the chassis frame, the last named cross-piece being located beneath but slightly in advance of the first named cross-piece and being formed with an inclined hole 21, which serves a purpose to be hereinafter set forth. The attaching means now under consideration likewise embodies a pair of brackets 22 and 23 designed for connection with the upper and lower cross-pieces respectively. The first named bracket is preferably in the form of an elongated plate formed with bolt holes and provided intermediate its ends with a rearwardly and downwardly inclined abutment 24. Although it is not necessary, the plate from which the bracket 22 is formed, is bent between its ends to form this abutment. It is to be understood, however, that the abutment may be constructed otherwise. This abutment is formed with a hole and a connecting bolt 25 passes therethrough and through the aforesaid inclined hole 21 and the screw-threaded end thereof passes through an internally screw-threaded hub 26 constituting a part of the bracket 23. At its upper end, this bolt is provided with a crank handle 27 which permits it to be conveniently rotated and this handle is such that it provides a shoulder 28 which is adapted to engage the abutment to enable the bolt to be tightened sufficiently to hold the luggage carrier in place on the platform of the vehicle. Inasmuch as the luggage carrier is formed in its top with a door, it will be seen that by opening the latter, access may be had to the interior thereof for operating the bolt 25.

Assuming that the luggage carrier C is in place on the vehicle, it will be seen that by opening the hinged cover thereof and grasping the crank handle 27 and rotating the bolt in the proper direction, the threaded end thereof will be disengaged from the threaded hub of the bracket 23 and the carrier permitted to be quickly and easily removed. In putting the luggage carrier in place, the operation is just reversed. In placing the truck body 1 in position, the guides 2 are engaged with the side bars of the chassis frame and the body slid into position. Then, the links of the respective attaching devices are swung into the notches of the brackets with which they co-act and the thumb nuts tightened and the body thus held in place.

Experience with attaching devices of the above construction has disclosed the fact that the luggage carrier can be removed and replaced with a truck body in a little over one minute's time. This can be accomplished by a single person and does not require a great deal of exertion to do it. After the washers on the links of the truck body attaching devices are seated in the countersunk recesses, there is little or no chance of the links becoming accidentally disengaged and permitting slippage or accidental displacement of the body. No matter how great the jar may be, it has been found that the attaching devices described will prove satisfactory in every way for a reasonable length of time. When the luggage carrier is in use, the attaching means is entirely hidden and in no way detracts from the appearance of the machine. It will therefore be seen that owners of Ford runabouts who often find occasion for light hauling will appreciate the invention herein shown and described because of the fact that it so fills a long felt need and desire in that it enables a runabout to be converted into a truck for hauling purposes in the shortest possible amount of time. These and other advantages and features of the invention have, no doubt, been made apparent from the foregoing description and drawings. Also, the invention is thought to be clearly set forth and there is apparently no need for a more lengthy description.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

The combination with a vehicle chassis frame having side bars and a seat positioned forwardly of the rear ends of the side bars, of a load-carrying box resting upon said side bars with its forward end engaging said seat, brackets carried by the lower forward corner portions of the side walls of said box, brackets secured against the outer faces of said side bars and having outwardly extending eyes disposed diagonally of the outer faces of the side bars at right angles to a line bisecting the angle between the bottom and forward end of said box, bolts carried by the first mentioned brackets and passing through the eyes of the second mentioned brackets and having threaded free ends and fastener nuts thereon for engaging the eyes of the second bracket and drawing the box forwardly and downwardly, and means for anchoring the rear end portion of the box against upward movement.

In testimony whereof I have hereunto set my hand.

SAMUEL HUNTER.